United States Patent [19]  [11] 4,339,123
Rich  [45] Jul. 13, 1982

[54] T-JOINT STRUCTURE FOR TRAMPOLINES AND THE LIKE

[76] Inventor: Rolland W. Rich, P.O. Box 3828, Albany, Ga. 31706

[21] Appl. No.: 272,111

[22] Filed: Jun. 10, 1981

[51] Int. Cl.³ .............................................. A63B 5/08
[52] U.S. Cl. ..................................... 272/65; 403/205
[58] Field of Search ................... 272/62, 63, 112, 113, 272/65, 85, 144, 70; 108/56.1, 115, 135, 156, 157; 5/110, 111, 114; 211/189; 248/150, 440; 297/441, 442; 403/174, 178, 205, 403

[56] References Cited

U.S. PATENT DOCUMENTS

| 774,393 | 11/1904 | Palmer | 403/205 |
| 1,488,244 | 3/1924 | Hinton | 272/113 |
| 2,858,551 | 11/1958 | Sidlinger | 272/65 |
| 2,991,841 | 7/1961 | Sampson et al. | 272/65 |
| 3,031,688 | 5/1962 | Southwood | 272/65 X |
| 3,502,330 | 3/1970 | Cheftel | 182/140 X |
| 4,157,801 | 6/1979 | Elmer | 403/174 X |
| 4,234,226 | 11/1980 | Colby | 297/441 |

FOREIGN PATENT DOCUMENTS

| 338753 | 7/1921 | Fed. Rep. of Germany | 5/114 |
| 1068946 | 5/1955 | France | 5/111 |
| 112241 | 1/1918 | United Kingdom | 5/114 |
| 626476 | 7/1949 | United Kingdom | 272/113 |

Primary Examiner—Richard J. Apley
Attorney, Agent, or Firm—Mason, Fenwick & Lawrence

[57] ABSTRACT

A demountable trampoline capable of being separated into components suitable for compact packaging for shipment, comprising a segmented tubular top rail frame forming a closed loop frame to be supported in elevated horizontal position by vertical ground-engaging leg members and support a trampoline sheet in encircled relation within the top rail frame suspended by plural suspension springs interconnecting margins of the trampoline sheet to the frame. The top rail frame is formed of elongated top rail tube member sections having a uniform inner diameter bore opening through the opposite ends of each section and having a transversely narrow elongated interlocking end slot opening through each respective end of each section and extending inwardly along the lowermost wall portion thereof a predetermined short distance longitudinally parallel to the center axis of its adjacent tube member end portion. A T-joint connector is provided for interconnecting adjacent ends of each top rail section and supporting the same from one of the leg members. The connector has a head member of circular cross-section having an outer diameter corresponding to the inner diameter of the top rail tube members for telescopically receiving them. The uppermost portion of the connector's leg member is flattened immediately adjoining the top cross-head member to a transversely narrow elongated tongue-like cross-section sized to interfit in and closely conform to said interlocking end slots in the adjacent confronting ends of a pair of said top rail tube member sections.

7 Claims, 5 Drawing Figures

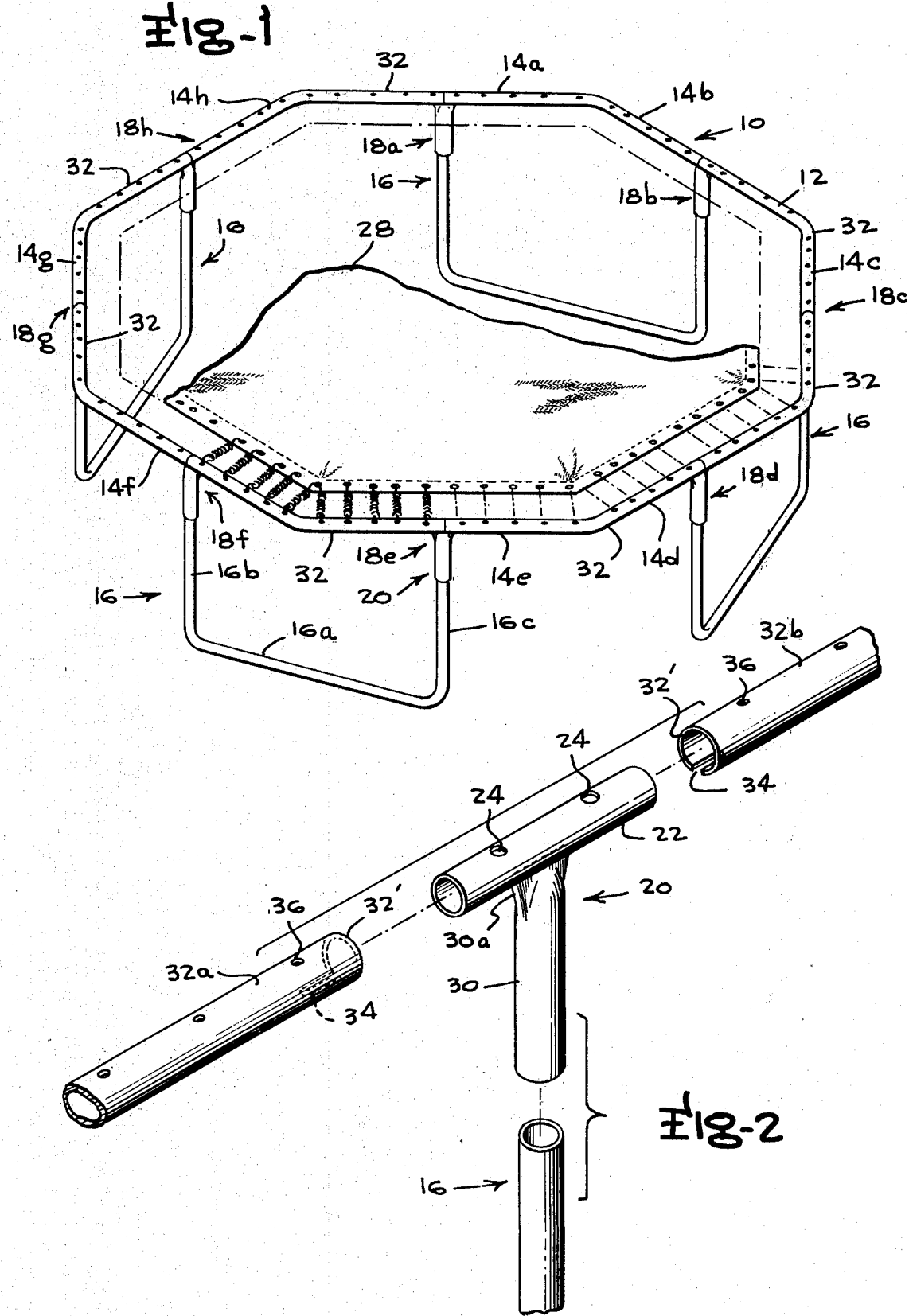

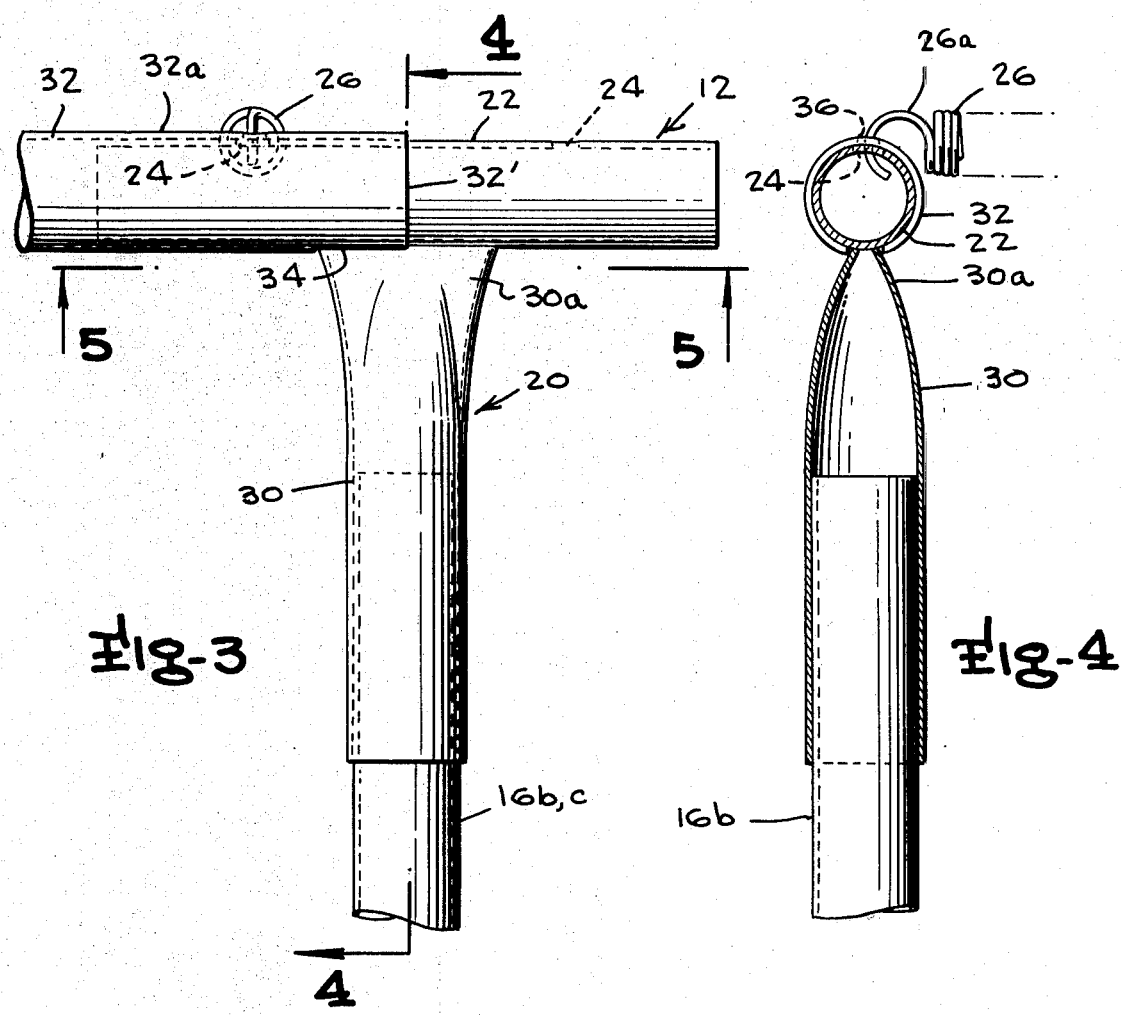
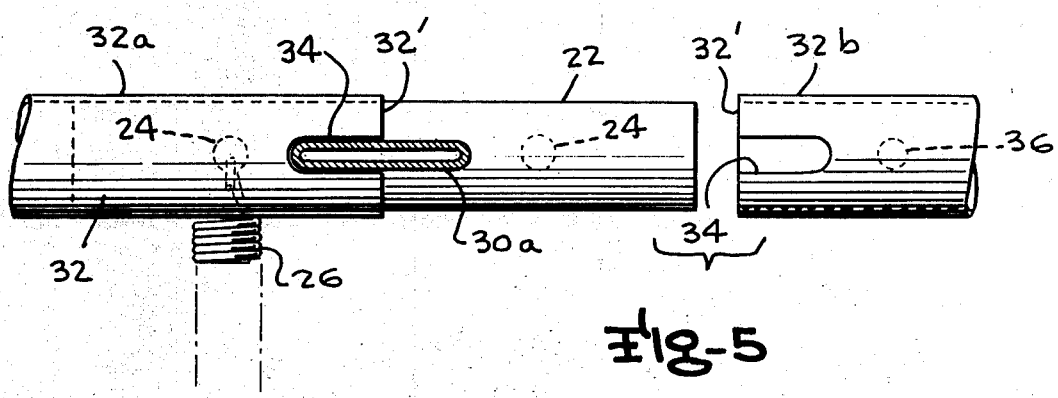

T-JOINT STRUCTURE FOR TRAMPOLINES AND THE LIKE

BACKGROUND AND OBJECTS OF THE INVENTION

The present invention relates in general to trampolines formed of a tubular top rail frame supported at an elevated horizontal plane above the ground by ground-engaging tubular legs and supporting a fabric sheet or web within the frame by springs, and more particularly to such trampolines having a novel T-joint joining the legs to the top rail in a manner significantly reducing the packaging size for trampolines.

Heretofore, trampolines have been generally formed with the leg sockets welded directly onto the top rail of the trampoline. The box necessary to package such trampolines for shipment ordinarily required an 8½' long ×8½" high ×28" wide box for packaging the components for shipment, due to the rigid connection and required length of the leg sockets welded in the customary manner to the top rail.

The present invention is directed to a novel trampoline frame construction, involving a T-joint of unique construction permitting sectioning of the trampoline frame into smaller pieces for packaging than could have been accomplished with the prior construction, while still providing a joint between the legs and the top rail which will not swivel, and wherein one size of leg can be employed with less material involved.

More specifically, the T-joint construction of the present invention permits joining of top rail tubular sections and U-shaped leg tubular frame components in a manner permitting the trampoline to be broken down into a package that is 4'×8"×20" in size, while still providing a well stabilized leg that will not swivel during use of the trampoline, and which permits assembly without any nuts or bolts spanning any joints.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a trampoline constructed in accordance with the present invention;

FIG. 2 is an exploded perspective view of the novel T-joint of the present invention and adjacent portions of the adjoining top rail tube portions and tubular leg portion for one of the joints of the trampoline;

FIG. 3 is a side elevation view of the novel T-section, with a portion of one of the top rail sections assembled thereon;

FIG. 4 is a vertical transverse section view thereof, taken along the line 4—4 of FIG. 3; and FIG. 5 is a horizontal section view, taken along the line 5—5 of FIG. 3.

DETAILED DESCRIPTION OF A PREFERRED EMBODIMENT

Referring to the drawings, wherein like reference characters designate corresponding parts throughout the several figures, there is illustrated in FIG. 1 a perspective view of a trampoline in erected form, constructed in accordance with the present invention, indicated generally by the reference character 10, which in outline and general configuration resembles conventional trampolines in that it includes a top rail frame 12 which, in the illustrated embodiment, forms a generally octagonal loop of straight sides 14a through 14h inclusive, formed of tubular members, for example about 1½ to 2" in diameter, designed to be arranged in a horizontal plane by U-shaped tubular legs 16 having a lower horizontal section 16a engaging the ground and two upright legs 16b and 16c. In the typical installation, four such U-shaped legs 16 would be provided, with the upright leg portions 16b,16c connected to adjacent straight sides of frame 12, such as sides 14b and 14c, near their midpoints. In the typical prior art installation, the tubular top rail sections 14a would have sockets welded to them, into which the uppermost ends of the upright leg portions of the U-shaped leg members would be fitted.

In the present invention, the horizontal tubular top rail sections are provided with the T-joint construction of the present invention, at the eight locations denoted by references 18a through 18h. These T-joint connections are formed off a T-joint connector member 20 having a tubular horizontal top cross-head member 22, for example formed of 1.660" diameter, 13 gauge tubing, having a pair of holes, for example about 0.56" diameter, indicated at 24, spaced typically about 2.5" inwardly from the outermost ends of the top cross-head member 22 (which may be about 10" long overall) to receive the hook ends 26a of coil springs 26 whose other innermost ends are connected to the trampoline canvas sheet or web 28 in any conventional manner, as by hook formations extending through grommets in the edge portions of the trampoline sheet 28. Extending downwardly from and welded to the top cross-head member 22 of the T-connector 20 is a tubular vertical socket leg member 30 of the T-connector forming a socket for receiving the uppermost end portions of the upright vertical leg portions 16b or 16c of the trampoline leg structure 16. The uppermost end portion of each vertical socket leg member 30 of the T-connector 20 is flattened as illustrated, for example to a maximum width of about 0.40", whereas the lower half of the socket leg member 30 is formed, for example, of about 1.900" outer diameter 13 gauge tubing, thereby providing a substantially uniform width flattened tongue-like connecting portion 30a at the uppermost end of the socket leg member 30 where it joins the cross-head member 22, which is elongated in a direction paralleling the axis of the top cross-head member 22.

The tubular top rail 12 is made-up of eight like-constructed bent tube sections, generally indicated by the reference character 32, two adjoining end portions of which are indicated at 32a and 32b in FIGS. 2 and 5, each having an axially elongated slot, indicated at 34, in the bottom portion thereof opening through the adjacent end (indicated at 32') and shaped to be substantially exactly complimentary to onehalf of the flattened connecting tongue portion 30a of the T-connector tubular stem 30. The tube sections 32 forming the tubular top rail 12, in the illustrated embodiment, are formed of 1.9" diameter 13 gauge wall tubing designed to telescope onto the two oppositely extending arms of the top cross-head member 22 of the T-connector 20 at the respective associated T-joint location 18, with the slots 34 in the adjacent ends of the two adjacent top rail tube sections 32a,32b, for example, fitting over the tongue connecting portions 30a of the T-connector. Assembly is completed by inserting the upwardly projecting leg portions 16b,16c of the U-shaped leg members 16 into the downwardly opening cylindrical sockets formed by the lower halves of leg socket member 30 of the T-connectors 20, the suspension springs 26 are connected at their inner ends to the grommets or other connector structure along the edges of the trampoline sheet 28, and the hooks 26a in the outer ends of the suspension springs are inserted through the holes 36 in the end portions of the tubular top rail sections 32 which register with the holes 24 in the top cross-head member 22 of the T-connector 20 when the tubing members 32 are fully assembled in abutment with each other at their proper telescoping positions, thus retaining the assembly in proper spring-locked condition.

By this construction, the top rail sections 32 can be sectionalized down to slightly less than 4' long sections by disconnecting them at the joints 18a,18h from the T-connectors 20, and the U-shaped leg member 16 and T-joints 20 can be packaged with the sectionalized top rail tubular members 30 and the springs and canvas in a convenient package size of 4'×8"×20".

I claim:

1. A demountable trampoline capable of being separated into components suitable for compact packaging for shipment, comprising a segmented tubular top rail frame forming a closed loop frame to be supported in elevated horizontal position by vertical ground-engaging leg members and support a trampoline sheet in encircled relation within the top rail frame suspended by plural suspension springs interconnecting margins of the trampoline sheet to the frame, the top rail frame being formed of elongated top rail tube member sections of predetermined length having a uniform inner diameter bore opening through the opposite ends of each section and having a transversely narrow elongated interlocking end slot opening through each respective end of each section and extending inwardly along the lowermost wall portion thereof a predetermined short distance longitudinally parallel to the center axis of its adjacent tube member end portion, a T-joint connector for interconnecting adjacent ends of each top rail section and supporting the same from one of the leg members comprising a horizontal top cross-head member of circular cross-section having an outer diameter corresponding to said uniform inner diameter bores of the top rail tube members and a vertical tubular socket leg member to form the leg of the T-joint joined at its uppermost end to the lowermost portion of the cross-head member at the midlength portion thereof and having a downwardly opening cylindrical bore in the lower portion thereof sized to telescopically receive the upper end portion of one of said leg members therein, the uppermost portion of said vertical socket leg member being flattened immediately adjoining the top cross-head member to a transversely narrow elongated tongue-like cross-section sized to interfit in and closely conform to said interlocking end slots in the adjacent confronting ends of a pair of said top rail tube member sections, whereby said tongue-shaped uppermost end portion interfits into said slots when the end portions of the adjacent pair of tube member sections are telescopically assembled onto the top cross-head member to positions disposing their confronting ends in abutment aligned with the center axis of the vertical socket leg member serving to restrain the top rail tube member sections against rotation about their axes, and connector means for restraining the top rail tube sections against axial displacement relative to the T-joint top cross-head member on which they are assembled.

2. A trampoline as defined in claim 1, wherein said top cross-head member and said top rail tube member sections have holes therethrough which register vertically at the fully assembled abutting positions of the top rail tube members to receive hook-shaped end portions of the suspension springs therethrough and form said connector means to restrain the top rail tube sections against rotation as well as axial displacement.

3. A trampoline as defined in claim 1, wherein each of said top rail tube member sections is of angular shape providing two straight tubular portions of equal length extending oppositely from an angular bend at the longitudinal midpoint of the tube member section.

4. A trampoline as defined in claim 2, wherein each of said top rail tube member sections is of angular shape providing two straight tubular portions of equal length extending oppositely from an angular bend at the longitudinal midpoint of the tube member section.

5. A trampoline as defined in claim 1, wherein said leg members are U-shaped tubular members providing a horizontal ground-engaging cross-bar portion and two upright legs to interfit in the socket leg members of the T-joint connectors at the opposite ends of alternate ones of the top rail tube member sections.

6. A trampoline as defined in claim 2, wherein said leg members are U-shaped tubular members providing a horizontal ground-engaging cross-bar portion and two upright legs to interfit in the socket leg members of the T-joint connectors at the opposite ends of alternate ones of the top rail tube member sections.

7. A trampoline as defined in claim 3, wherein said leg members are U-shaped tubular members providing a horizontal ground-engaging cross-bar portion and two upright legs to interfit in the socket leg members of the T-joint connectors at the opposite ends of alternate ones of the top rail tube member sections.

* * * * *